Patented Apr. 30, 1935

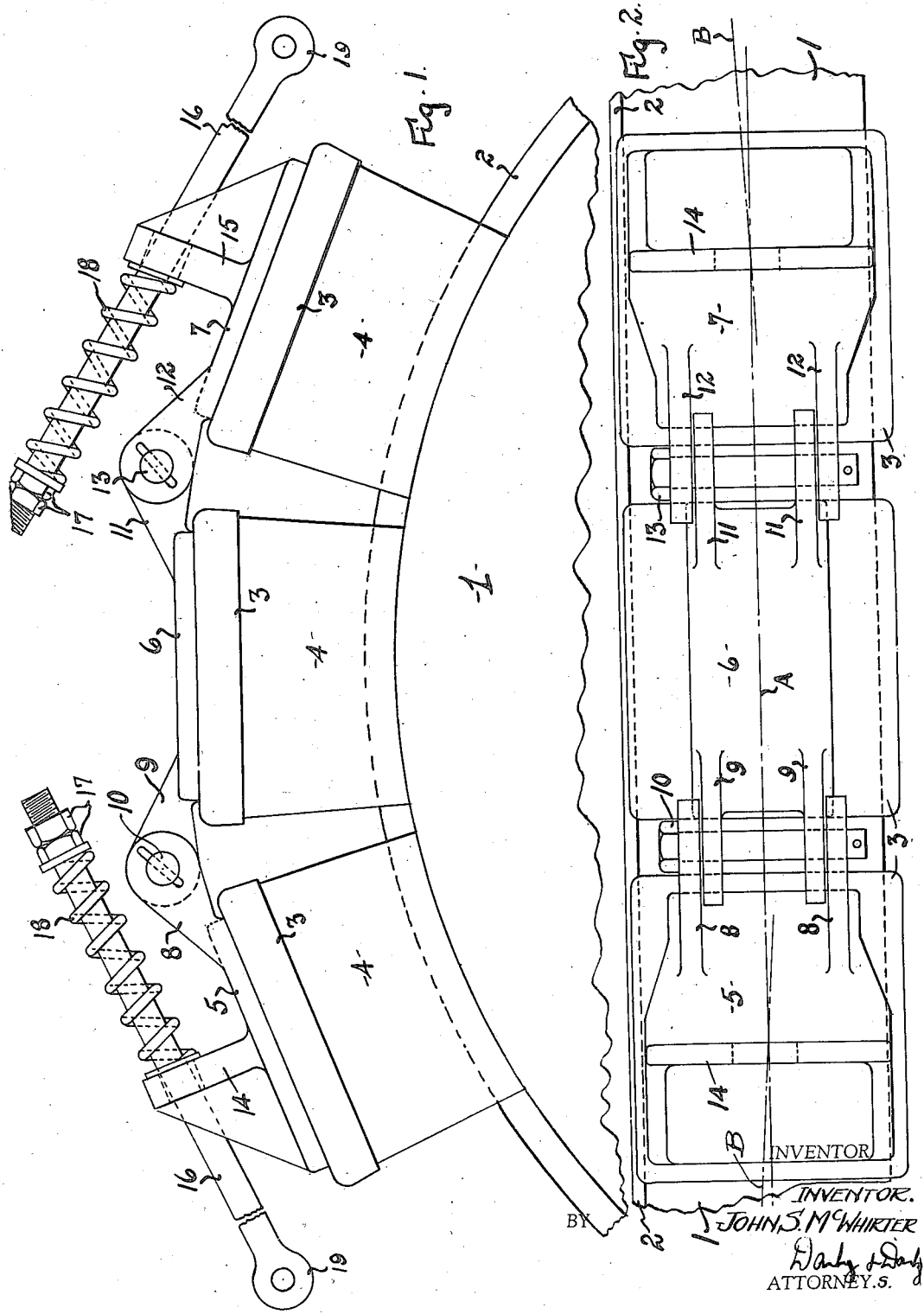

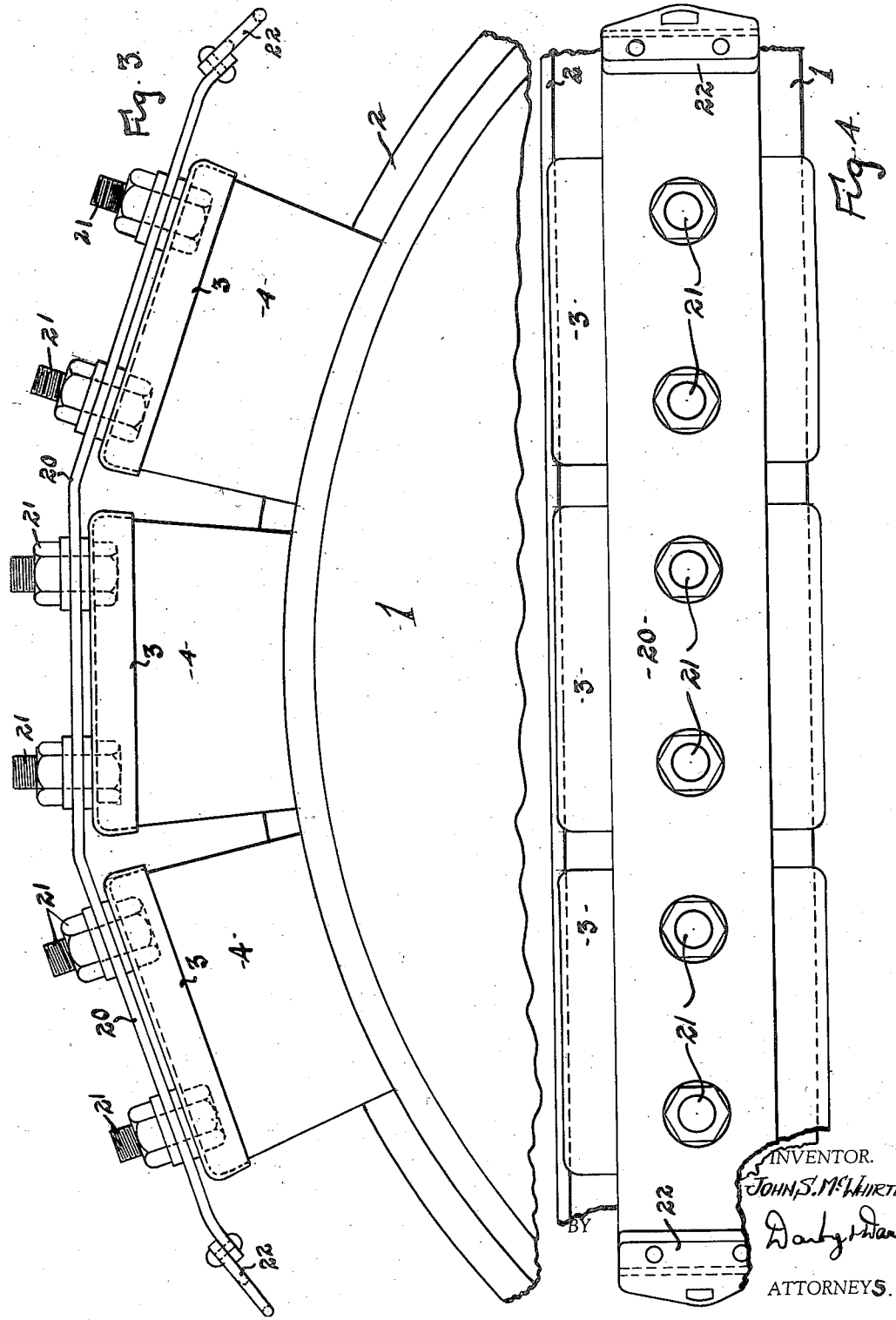

1,999,418

UNITED STATES PATENT OFFICE 1,999,418

WHEEL REFINISHER

John S. McWhirter, Southport, Conn.

Application October 16, 1934, Serial No. 748,462

11 Claims. (Cl. 51—255)

This invention relates to improvements in refinishers or grinders for vehicle wheels.

The main object of the invention is to provide an efficient and mechanically simplified structure for application to vehicles such as street cars, subway cars and the like, so that the flats and other irregularities in the tire and flange of the wheels may be removed while the vehicle is in use and without removing the wheels from the vehicle.

These and many other objects will appear from the following disclosure are secured by means of this invention.

This invention resides substantially in the combination, construction, arrangement and relative location of parts, all as will be set forth in full detail below.

In the drawings,

Fig. 1 is a side elevational view of the device of this invention showing its application to a vehicle wheel most of which has been broken away;

Fig. 2 is a top plan view thereof;

Figs. 3 and 4 are side elevational and top plan views respectively of a modified form of structure in accordance with this invention.

In the operation of modern transportation vehicles such as street cars, subway cars, and the like, the necessity for frequent and rapid stopping requires the use of considerable braking force which often causes the wheels to lock, grinding small flats on the surface thereof which are of course undesirable. Sometimes the sliding wheels grind or wear flat spots on the wheel surface of sufficient extent to cause considerable pounding when the vehicle is in motion. In addition normal wear on the wheels gradually causes them to lose their correct shape. It becomes necessary, therefore, at regular intervals to resurface the car wheels to return them to a true uniform shape having smooth surfaces.

Many efforts have been made to effect the refinishing or regrinding of the wheels both in the shops without removing the wheels from the vehicle, and when the vehicle is in use on the road. Little success has attended these efforts largely because of the fact that the wheels and trucks of the vehicles undergo considerable relative movement between the parts due not only to the normal play therebetween, but due also to the spring suspension of the wheels in the trucks. The result has been that the best prior practice has required that the wheels be removed from the vehicle in the shops and reground and resurfaced on special machinery. This is naturally an expensive and time consuming operation and necessitates the removal of the vehicle from service.

The purpose of this invention is to provide an exceedingly simple form of structure which it has been found efficiently resurfaces car wheels not only on the vehicle but while the vehicle is in actual service.

As illustrated in Figs. 1 and 2 the device comprises an articulated support or carrier for the grinding or refinishing tools which is applied to the car wheel in such a way that it conforms to the general contour thereof and is resiliently held in engagement with the surface thereof in the proper position, notwithstanding the relative movement between the truck and the wheels. At this point it may be noted that the vehicle wheels are subjected to radial movement due to the spring suspension, to axial movement due to the side sway of the vehicle. The device of this invention is so constructed that it normally hugs the wheel and follows it in all of its movements.

The wheel is indicated at 1, having the usual flange 2. At 3 are a plurality of carriers or supports for the resurfacing or grinding tools, which have been illustrated as blocks of suitable abrasive shaped at their cutting ends to fit the general contour of the wheels. The carriers 3 are illustrated as shallow containers into which the tools are secured in any suitable manner, as by cementing and/or moulding or clamping. Secured by welding, riveting, bolting or the like to the upper surface of each carrier are the plates 5, 6 and 7. Plates 5 and 6 have pairs of extending ears or arms 8 and 9 respectively which are pivotally connected together by means of the pivot pin 10. The plates 6 and 7 are likewise provided with pairs of ears or arms 11 and 12 respectively which are pivotally connected together through pivot pin 13. This arrangement provides an articulated structure for a plurality of cutting tools which when subjected to the proper forces fit snugly around the cylindrical surface of the wheel. The plates 5 and 6 are provided with integral or attached arms or ears 14 and 15 respectively having openings therethrough in which lie the rods 16. The outer ends of these rods are threaded to receive a pair of lock nuts 17 which hold the springs 18 between them and the adjacent ears. The other ends of the rods 16 are provided with enlarged eyes by means of which they may be attached to some fixed part of the vehicle such as the trucks. The rods 16 are attached to the vehicle as illustrated in Fig. 2 in such a way as to draw the articulated tool carrier towards the flange. Thus the center line of the wheel and the articulated carrier is indicated at A, while the center lines of the rods 16 when properly attached are illustrated at B. The center lines B extend at an angle to the center line A, as shown, so that the springs 18 act to draw the tool carrier against the flange.

It will also be noted from Fig. 1 that the points of attachment are at such a horizontal level as to pull the tool carrier down against the surface of the wheel. Thus, with this arrangement the grinding blocks or tools 4 are held snugly against the tire surface and against the flange, and are held in this position regardless of the movement of the wheel in any radial direction or in either axial direction.

In the modified arrangement of Figs. 3 and 4 the wheel and its flange have been indicated at 1 and 2 as before. The tool carriers 3 and the tools 4 are likewise the same as before. The tool carriers in this case, however, are connected together by means of a shaped strip of spring steel or other suitable metal by means of the nuts and bolts 21. The strip 20 is generally shaped so as to hold the bolts against the curved surface of the wheel. The ends of the strips are provided with eye plates 22 to provide a ready means for attachment to fixed parts of the vehicle such as the truck. In this case rods bolted to the truck would have their ends hooked in to the eyes of the plates. As before, the attaching means draws the ends of the strip downwardly and towards the flange of the wheel so as to cause the tools to snugly fit and follow the movements of the wheel. The spring strip 20 permits the tools under the pressure exerted by the attaching means to properly fit the contour of the wheel.

From the above description it will be apparent that this invention resides in certain principles of construction and application which may be embodied in other physical forms and applied in other ways by those skilled in the art without departure from the scope of the invention. I do not, therefore, desire to be strictly limited to the disclosure as given for purposes of illustration, but rather to the scope of the appended claims.

What I seek to secure by United States Letters Patent is:

1. A surfacing device for cylindrical members comprising an articulated tool holder, a plurality of tools in said holders, and yieldable means acting on the ends of the tool holder in a direction substantially tangentially to the cylindrical member, whereby the tools lie against the cylindrical surface.

2. A surfacing device for rotatable cylindrical members comprising a plurality of tool holders pivotally connected together, a tool in each of said holders, and independent means for exerting tension on the tool holders at the ends thereof tangentially of the cylindrical member, whereby the tools fit around the cylindrical surface of the member.

3. A finishing device for rotatable cylindrical members comprising a plurality of tool holders connected together to permit relative movement therebetween, a tool in each holder, and means for resiliently and independently attaching the ends of the connected tool holders to a fixed support relative to the cylindrical member, whereby the tools fit the cylindrical surface thereof.

4. A device for surfacing cylinders comprising a spring metal band support having a plurality of individual spaced tool holders attached thereto, a tool in each holder, and means at the ends of the support for attaching it to fixed points, and lying substantially tangentially to the cylinder.

5. The combination for use with a flanged car wheel of an articulated tool holder having a plurality of separate tools mounted therein, and means including springs for attaching the ends of the articulated holder to fixed points relative to the wheel whereby the tool holder is tensioned in a direction tangentially to the surface of the wheel.

6. An apparatus as described for use with a flanged vehicle wheel, comprising a plurality of tool carriers connected together for relative movement, a tool in each carrier, and means for attaching the end carriers to a fixed part of the vehicle whereby the tools are pulled radially against the surface of the wheel and axially against the inner face of the flange.

7. A combination as described for use with a flanged wheel, comprising a plurality of tool holders, a tool in each holder, a strip of spring material interconnecting the carriers, and means for attaching the ends of the strip to fixed parts of the vehicle whereby the tools are urged against the surface of the wheel and the flange.

8. The combination for use with the flanged wheel of a vehicle while the vehicle is in use and including supporting trucks in which the wheel is journaled, the combination comprising an articulated tool holder, a plurality of individual tools mounted in said holder, rods pivotally connected to the ends of the holder at one end and secured at the other end to fixed points with respect to the wheel, said rods lying substantially tangentially to the surface of the wheel and in planes at an acute angle to the plane of the wheel whereby the tools are urged against the wheel in a radial direction and against the flange in an axial direction.

9. The combination for use with the flanged wheel of a vehicle while the vehicle is in use and including supporting trucks in which the wheel is journaled, the combination comprising an articulated tool holder, a plurality of individual tools mounted in said holder, rods pivotally connected to the ends of the holder at one end and secured at the other end to fixed points with respect to the wheel, said rods lying substantially tangentially to the surface of the wheel and in planes at an acute angle to the plane of the wheel whereby the tools are urged against the wheel in a radial direction and against the flange in an axial direction, and springs interposed between the rods and carrier.

10. The combination for use with a flanged vehicle wheel of a plurality of interconnected tool holders, and means including springs for attaching the ends of the tool holders to fixed points with respect to the wheel to urge them against the surface of the wheel and the side of the flange.

11. The combination for use with a single flanged vehicle wheel of a plurality of pivotally connected tools for surfacing the wheel and its flange, and resilient means for urging the tools against the tire of the wheel and the face of the flange.

JOHN S. McWHIRTER.